United States Patent [19]

Rickard et al.

[11] 4,036,687
[45] July 19, 1977

[54] NUCLEAR REACTORS

[75] Inventors: Allan Robert Rickard, Lutterworth; Brian Victor George, Willoughby Waterleys, both of England

[73] Assignee: Nuclear Power Company Limited, London, England

[21] Appl. No.: 575,342

[22] Filed: May 7, 1975

[30] Foreign Application Priority Data

May 10, 1974 United Kingdom ............ 20907/74

[51] Int. Cl.² .......................................... G21C 19/20
[52] U.S. Cl. ........................................ 176/37; 176/38; 176/87
[58] Field of Search .................. 176/30, 31, 32, 37, 176/38, 87

[56] References Cited

U.S. PATENT DOCUMENTS

| 3,321,374 | 5/1967 | Windle et al. | 176/38 X |
| 3,752,738 | 8/1973 | Naymark | 176/87 |
| 3,765,549 | 10/1973 | Jones | 176/30 X |
| 3,937,651 | 2/1976 | Schabert et al. | 176/38 |

FOREIGN PATENT DOCUMENTS 1,247,093  1/1960  France ..................... 176/30

Primary Examiner—Peter A. Nelson
Attorney, Agent, or Firm—Kirschstein, Kirschstein, Ottinger & Frank

[57] ABSTRACT

In a nuclear reactor installation comprising a fluid-cooled nuclear heat source within a primary pressure vessel, the latter is enclosed within a secondary containment means which comprises a lower wall portion surrounding the primary pressure vessel, an annular portion extending out from the lower wall portion, and an upper portion integral with the annular portion and extending over it and over the primary pressure vessel and housing handling means for lifting fuel and other reactor components through normally sealed vertical penetrations in the roof of the primary pressure vessel (giving access to the reactor core) and in the said annular portion (giving access to new and spent fuel stores and other auxiliary facilities disposed outside the secondary containment and wholly or partly below the said annular portion).

6 Claims, 5 Drawing Figures

NUCLEAR REACTORS

This invention relates to nuclear reactors.

In co-pending United Kingdom patent application No. 20906/74 (Case BN 501 ) and in corresponding Applications filed in the United States of America and in Canada, there is disclosed a nuclear reactor installation design in which a primary pressure vessel, containing a nuclear reactor core and primary coolant circuits therefor, and a shielded facilities block, containing a new fuel store, a spent fuel store and other facilities and handling active components, are enveloped together within an envelope which provides protection for both against external missiles such as crashing aircraft, and are isolated from one another, within the evelope, by a pressure-tight protective wall and roof which, together with the major part of the said envelope and of a foundation raft which supports both the primary pressure vessel and the shielded facilities block, consitute a secondary containment means for the primary pressure vessel. Since the said envelope envelops both the primary pressure vessel and the shielded facilities block, it must be of correspondingly large size.

It is an object of the present invention to provide a nuclear reactor installation which retains many of the advantages of the above-mentioned installation but in which, for a corresponding size of reactor primary pressure vessel, the enveloping envelope can be of substantially reduced size.

According to the invention, there is provided a nuclear reactor installation comprising a fluid-cooled nuclear heat source, a primary pressure vessel containing the heat source, an outer envelope enclosing the primary pressure vessel and constituting secondary containment means therefor and providing external-missile protection therefor, and a plurality of auxiliary-facility stations disposed outside the outer envelope, wherein the outer envelope comprises a lower wall portion surrounding the primary pressure vessel, an annular portion integral with the lower wall portion and extending outwardly therefrom, and an upper portion integral with the annular portion and extending over the annular portion and over the primary pressure vessel, the annular portion and the primary pressure vessel being formed with sealable vertical penetrations communicating with the respective auxiliary-facility stations and with the primary pressure-vessel interior respectively and there being provided, in the said upper portion, handling means for lifting reactor components vertically through such penetrations and transporting them over the said annular portion and the primary pressure vessel.

In a preferred embodiment of the invention, the said handling means comprises a plurality of fixed gantries mounted on the said annular portion, a movable gantry mounted over the primary pressure vessel for movement thereover and alignable with each of the fixed gantries, and a plurality of handling machines each positionable on a respective one of the fixed gantries for operation at a respective one of the penetrations in the said annular portion and each movable from its respective gantry on to the polar gantry when aligned therewith.

Such an embodiment of a nuclear reactor installation according to the present invention is described below, with reference to the accompanying drawing, in which.

Figure 1:
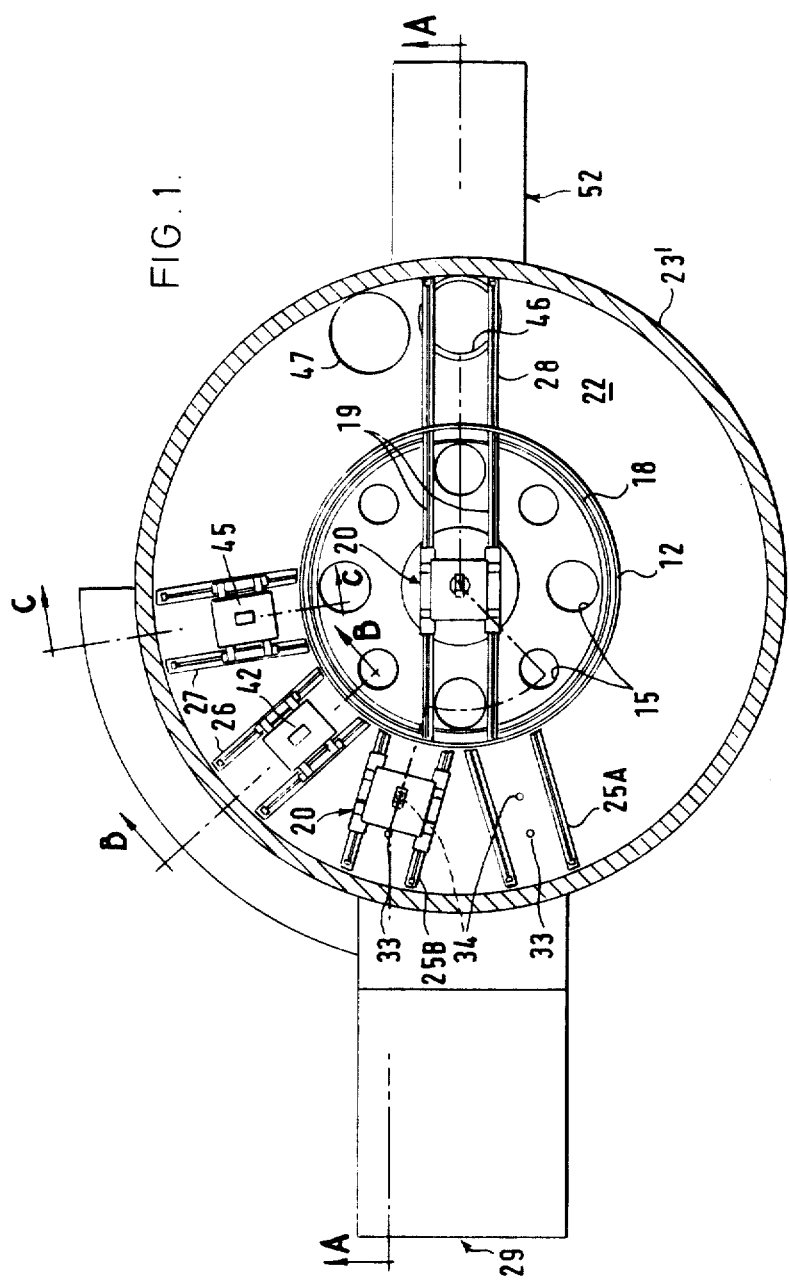
FIG. 1 is a plan view of the installation, omitting the dome of a secondary containment envelope thereof so as to show parts disposed therebelow.

The fluid-cooled nuclear heat source of the installation shown in the drawing is a nuclear reactor of the kind known as the High Temperature Reactor, through it will be understood that the invention is not limited to reactors of the kind.

As shown in the drawing, a core 11 of the reactor is housed in known manner within a primary pressure vessel 12 of reinforced concrete, supported on legs 13 which stand on a massive foundation raft 14. The vessel 12 is formed, in known manner, within the thickness of its walls with chambers 15 communicating through ducts 16 and 17 with the interior proper of the vessel and housing heat exchangers (not shown) and coolant-gas circulators (not shown) which force pressurised coolant gas through the ducts 16, down through the core 11, and thence (through the ducts 17) back to the chambers 15 and through the primary sides of the heat-exchangers contained therein, prior to being recirculated.

The roof of the primary pressure vessel 12 is formed with normally-plugged standpipes 12', and the chambers 15 are open upwardly (though also normally plugged), thus giving access from above to the core 11 and to the chambers 15 for refuelling purposes and for removal and replacement as may be necessary of parts of the core structure other than those containing fuel, and of heat exchangers and circulating pumps. A circular rail track 18 mounted on the primary pressure vessel 12 supports a polar gantry 19 disposed diametrically across the primary pressure vessel and rotatable about the vertical axis thereof, and either of two bogie-mounted refuelling machines 20 can run along the gantry 19 to be positioned at any desired location above the primary pressure vessel.

Figure 3:
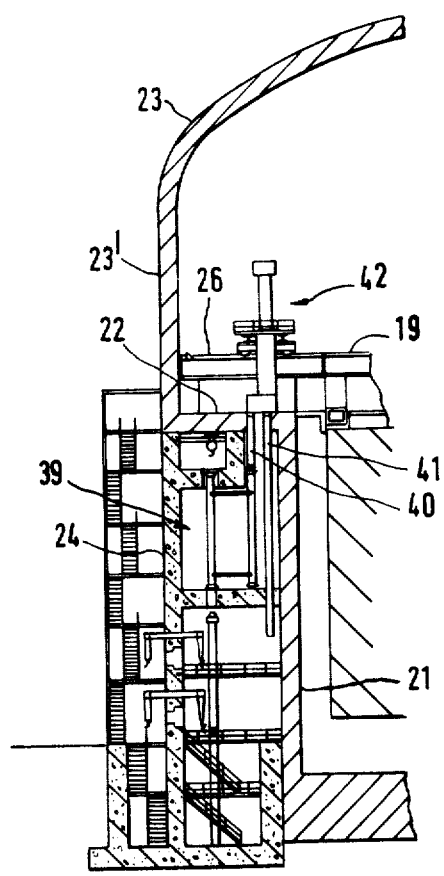
FIGS. 3 and 4 are partial vertical sectional views of the installation, taken on the lines B — B and C — C, respectively, of FIG. 1.
Figure 4:
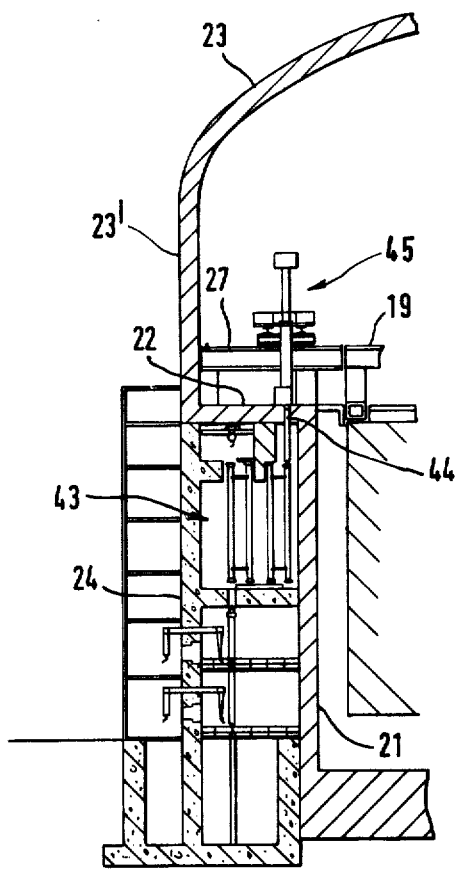
Figure 5:
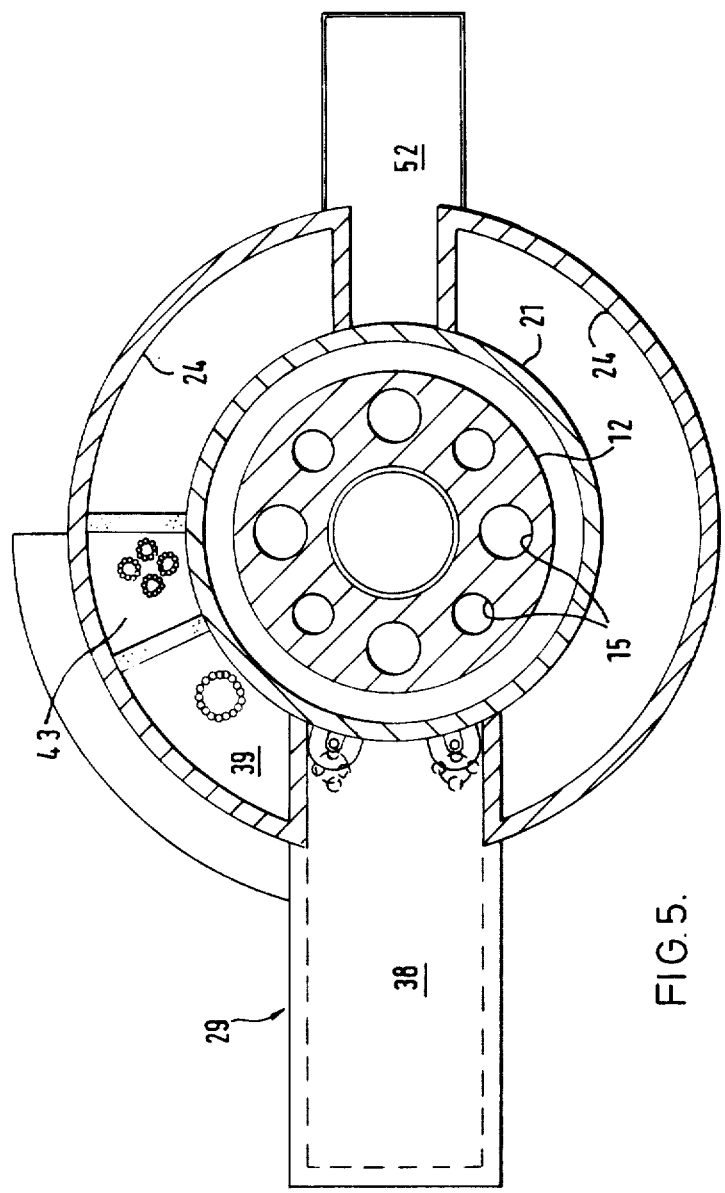
FIG. 5 is a horizontal sectional view of the installation, taken on the line D — D of FIG. 2.

Secondary containment means for the reactor is constituted by an envelope composed of the foundation raft 14, an annular lower wall portion 21 surrounding the pressure vessel 12, an annular platform 22 extending outwardly from the top of the wall 21 and integral therewith, and an upper dome 23 which extends over the primary pressure vessel 12 and the surrounding platform 22. (The weight of the dome 23 is supported by a generally annular supporting wall 24 (see FIGS. 3, 4 and 5) which is effectively a downward extension of the annular part 23' of the dome 23 and which surround the lower wall portion 21.) The pressure-tight envelope which thus constitutes secondary containment means of the rector is made of adequate strength and integrity to resist the effects of an explosive accident causing rupture of the pressure vessel, and to contain escapes of pressure and of radioactive materials, as well as any missiles, resulting from such an accident. The envelope is also designed to give adequate protection to its interior from external missiles such as crashing aircraft.

Radially disposed on the platform 22 are five stationary gantries 25A, 25B, 26, 27 and 28, each of which, when the rotatable polar gantry 19 is aligned therewith, serves as an extension of the polar gantry. Thus the refuelling machine 20 which in FIGS. 1 and 2 is shown supported on the gantry 19 can be moved on to the gantry 25A after the gantry 19 has been aligned therewith; and then, after appropriate rotation of the gantry 19, the other refuelling machine 20 can be moved on to it from its illustrated position on the gantry 25B.

Below the gantries 25A and 25B and that part of the platform 22 which supports them is one end of a shielded facilities block 29 which extend outwardly through a gap in the wall 24. The shielded facilities block 29 contains a bay 30 for the reception, storage and preparation of new fuel, a bay 31 in which new fuel is assembled into columns for insertion into the reactor and a loading bay 32 (disposed below the platform 22 and between the wall portion 21 and the wall 24) from which such columns can be picked up by either of the refuelling machines 20, resting on one of the gantries 25A and 25B, through penetrations 33 which are normally pressure-sealed but which, when unplugged, give access through the platform 22. Adjacent the penetrations 33 are two further penetrations 34 which, when unplugged, similarly give access to respective fuel-transfer machines 35 by means of which spent fuel, removed from the core 11 by either of the refuelling machines 20, can be brought within the ambit of a handling crane 36 to be deposited thereby in a spent-fuel store 37 in which it will be retained for a suitable period before being shipped away from the installation.

Figure 2:
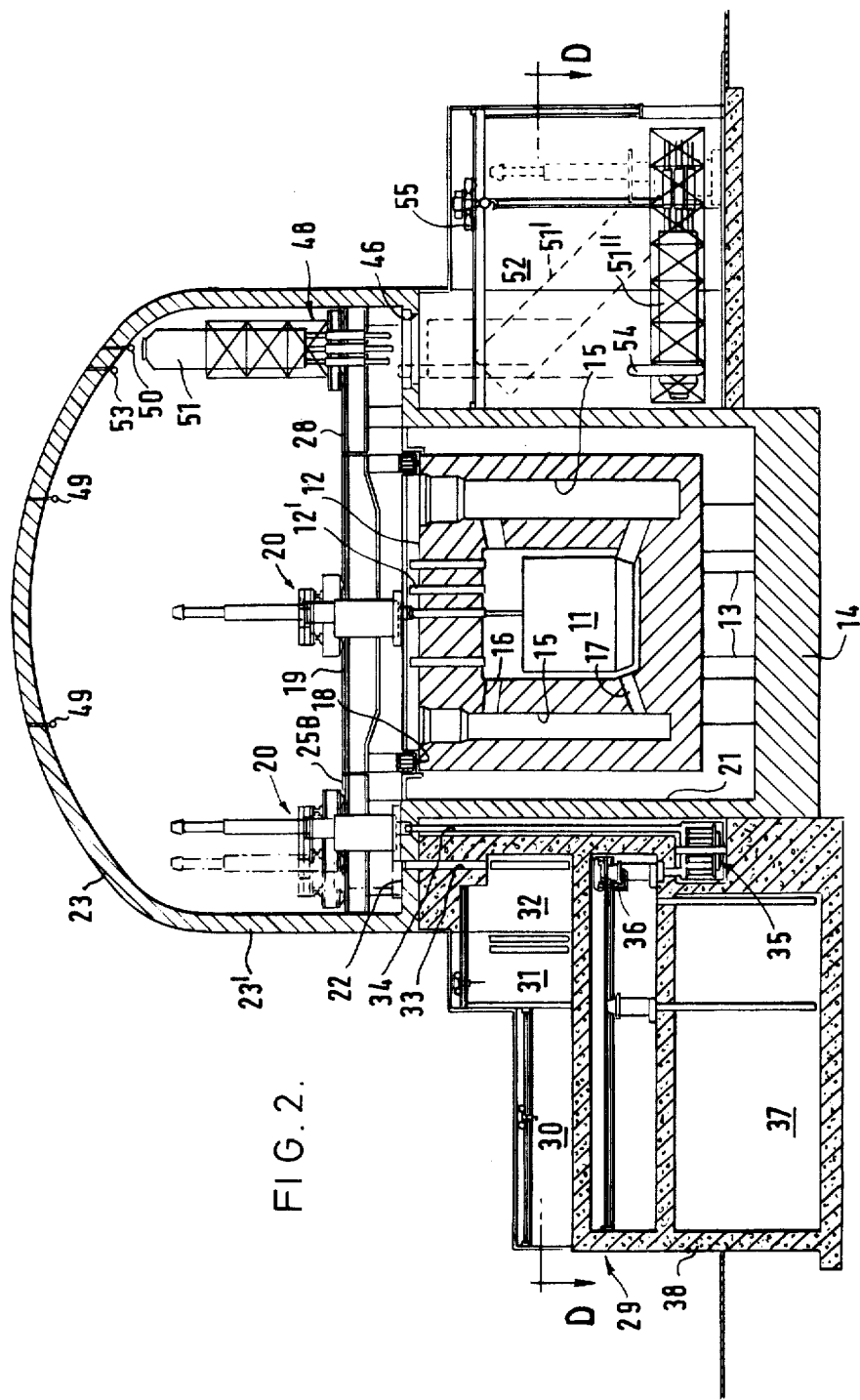
FIG. 2 is a vertical sectional view of the installation, taken on the line A — A of FIG. 1.

As shown in FIG. 2, the transfer machine 35, crane 36 and spent fuel store 37, as well as the penetrations 33 and 34 are enclosed in walls 38 which are designed to give adequate protection against external missiles such as crashing aircraft; and it will be understood that, if desired, this protective enclosure may be designed also to include the bays 30, 31 and 32 for new fuel.

The above-described new-fuel and spend-fuel facilities constitute two of several auxiliary-facility stations with which the installation is equipped, and with which respective vertical penetrations through the platform 22 communicate. Another such auxiliary-facility station is a facility 39 for the assembly, seal-changing and drop-testing of standpipes, the facility 39 being disposed between the walls 21 and 24 and accessible, through penetrations 40 and 41, to a bogie-mounted standpipe handling machine 42 when this is positioned on the gantry 26 (from which it can run on to the gantry 19, when this latter is appropriately aligned, for work on the pressure vessel 12).

Similarly, the gantry 27 is positioned over a control-rod storage and maintenance facility 43 disposed between the walls 21 and 24 and accessible, through a penetration 44, to a bogie-mounted control-rod handling machine 45 when this positioned on the gantry 27 (from which is can run on to the gantry 19, when this latter is appropriately aligned, for work on the core 11, through the standpipes 12').

Below the gantry 28, the platform 22 is formed with a main access hole 46 giving access to the interior of the secondary containment means. This hole, normally sealed by a plug 47 which can, however, be removed and parked nearby on the platform 22 as shown in FIG. 1, is the route by which heat exchangers and coolant circulators removed from or for insertion into the chambers 15 are loaded out of or into the secondary containment space. A bogie-mounted transport rig 48 for this purpose is shown in FIG. 2 on the gantry 28, from which it can run on to the gantry 19 (when suitably aligned) to be positioned over any of the chambers 15. The dome 23 is provided with an anchorage point 49 over each chamber 15 for anchoring suitable lifting means (not shown) and a further anchorage point 50 is provided over the main access hole 46. Thus a heat exchanger may be removed from its chamber 15 by lifting means attached to the anchorage point 49 thereabove, and then lowered on to the transport rig 48 after this latter, on the gantry 19, has been positioned below it. After any necessary rotation of the gantry 19, the rig 48 carrying the heat exchanger (as indicated by reference numeral 51 is FIG. 2) can be run on to the gantry 28; and after again raising the heat exchanger by means of lifting gear attached to the anchorage point 50, and moving the rig 48 out from below, the heat exchanger can be lowered through the hole 46, from which the plug 47 has been removed, into an access bay 52 which extends outwardly through a gap in the wall 24. A further anchorage point 53 enables a sling 54, temporarily attached to the upper end of the heat exchanger, to support this upper end while the lower end, by means of a travelling crane 55, is drawn laterally outwardly so that the heat exchanger is simultaneously tipped and lowered, through a position 51' indicated in broken line, to a horizontal position 51" after which it can be moved out of the bay 52 and away from the installation. A replacement heat exchanger would, of course, be introduced by using the same procedure in reverse.

The anchorage point 50 is made capable of supporting the heaviest piece of equipment which it may be desired to pass through the main access hole 46. For example, a refuelling machine 20 on its bogie may be positioned on the gantry 28 and then, after it has been released from the bogie and the bogie has been removed, it may be lowered through the access hole 46; equally, the hole 46 provides a means of introducing or removing standpipe assemblies as may be necessary.

It will be appreciated that in the installation shown in the drawing and according to the present invention, the secondary containment means (within which the pressure may be normally maintained at or below or above atmospheric, for example half-way between atmospheric pressure and the normal pressure within the pressure vessel 12) is of substantially reduced size as compared with the installation disclosed in the said co-pending Application, but that the two installations have in common that, in addition to secondary containment and aircraft crash protection for the reacator core, the shielded facilities block is isolated from the secondary containment region and is also provided with aircraft crash protection. A further feature common to both installation is the fact that all lifting and lowering actions within and into and out of the secondary containment region are accomplished vertically.

We claim:

1. A nuclear reactor installation comprising a fluid-cooled nuclear heat source, a primary pressure vessel containing the heat source, a secondary pressure containment vessel enclosing the primary pressure vessel and providing external-missile protection therefor, and a plurality of auxiliary-facility stations disposed outside the secondary pressure containment vessel, wherein the secondary pressure containment vessel comprises a lower wall portion surrounding the primary pressure vessel, an annular wall portion integral with the lower wall portion and extending outwardly therefrom, and an upper wall portion integral with the annular wall portion and extending over the annular wall portion and over the primary pressure vessel, the annular wall portion and the primary pressure vessel being formed with openable sealed vertical penetrations communicating with the respective auxiliary-facility stations and with the primary pressure-vessel interior respectively and handling means being provided, within the secondary pressure containment vessel and above the said annular wall portion and the primary pressure vessel, for lifting reactor components vertically through such penetrations and transporting them over the said annular wall portion and the primary pressure vessel.

2. A nuclear reactor installation as claimed in claim 1, wherein the said upper portion and the said annular portion of the secondary pressure containment vessel are supported, at the outer periphery of the latter, by a supporting wall which surround the said lower wall portion.

3. A nuclear reactor installation as claimed in claim 2, wherein at least one of the said auxiliary-facility stations is disposed below the said annular portion and between the said lower wall portion and the supporting wall.

4. A nuclear reactor installation as claimed in claim 2, wherein said supporting wall has an aperture and at least one of the said auxiliary-facility stations extends through said aperture and has a part which is outside the said supporting wall and a part which is disposed below the said annular wall portion and between the said aperture and the said lower wall portion.

5. A nuclear reactor installation as claimed in claim 1, wherein the said handling means comprises a plurality of fixed gantries mounted on the said annular wall portion, a movable gantry mounted over the primary pressure vessel for movement thereover and for alignment with each of the fixed gantries, and a plurality of handling machines each movable into position on a respective one of the fixed gantries for operation at a respective one of the penetrations in the said annular wall portion and each movable from its respective gantry on to the movable gantry when aligned therewith.

6. A nuclear reactor installation as claimed in claim 5 wherein the movable gantry is a polar gantry rotatable about a vertical axis and the fixed gantries are disposed radially with respect to that vertical axis.

* * * * *